United States Patent [19] [11] 3,796,868

Kaul et al. [45] Mar. 12, 1974

[54] VARIABLE THRESHOLD DIGITAL CORRELATOR

[75] Inventors: Pradman Prithvinath Kaul, Washington, D.C.; William Gaunt, Potomac; Harold Ford, Clarksburg, both of Md.

[73] Assignee: Communications Satellite Corporation, Washington, D.C.

[22] Filed: Aug. 11, 1972

[21] Appl. No.: 279,892

[52] U.S. Cl. .................. 235/181, 235/175, 235/177, 340/146.2

[51] Int. Cl. .................. G06f 15/34

[58] Field of Search ........... 235/181, 152, 156, 175, 235/177; 340/146.2

[56] References Cited

UNITED STATES PATENTS

| | | | |
|---|---|---|---|
| 3,463,911 | 8/1969 | Dupraz et al. | 235/181 |
| 3,517,175 | 6/1970 | Williams | 235/177 |
| 3,492,470 | 1/1970 | Gorbatenko | 235/181 |
| 3,711,692 | 1/1973 | Batcher | 235/175 |
| 3,678,259 | 6/1972 | Kyser | 235/156 |
| 3,376,411 | 4/1968 | Montani et al. | 235/181 |
| 3,541,314 | 11/1970 | Webb (Anderson) | 235/181 |
| 3,604,911 | 9/1971 | Schmitt | 235/181 |

*Primary Examiner*—Felix D. Gruber

*Attorney, Agent, or Firm*—Sughrue, Rothwell, Mion, Zinn & Macpeak

[57] ABSTRACT

A digital code word correlator for detecting a unique code word in a serially received data stream. The correlator includes a digital adder tree producing a binary number representing the number of matches between the bits of the received word and the bits of a stored replica of the expected unique word. The binary number is supplied to true and complement variable threshold digital comparators which generate detection signals in response to predetermined numbers of matches.

8 Claims, 3 Drawing Figures

VARIABLE THRESHOLD DIGITAL CORRELATOR

BACKGROUND OF THE INVENTION

1. Field of the Invention

The invention is in the field of variable threshold code word correlators.

2. Description of the Prior Art

In digital communications systems, a transmitter often has to signal a receiver that a particular event, such as the beginning of a burst in a TDMA system, has occurred. To accomplish this signalling, the transmitter transmits a unique pattern of bits called a unique code word or simply a unique word. In order to detect the unique word, the receiver must have a unique word detector or correlator, as it is often called, which operates at the serial bit rate of the system. Conventionally, an n-bit unique word correlator includes an n-bit shift register serially receiving the transmitted data stream and an n-bit storage register storing a replica of the expected unique word. As each new received bit enters the shift register, a new word is presented for comparison with the stored unique word. A comparator is coupled to the shift register and the storage register for carrying out the comparison.

Ideally, there are no errors in the transmitted unique word and thus detection of the unique word would occur when there is complete identy between the received n-bit word and the stored n-bit unique word. However, bit errors may occur in the transmission of the unique word to the receiver. Thus the received unique word will not match up having certain bit errors therein, completely with the stored unique word. To overcome this problem it is common practice to provide the correlator with an error threshold $\epsilon$. For example, the correlator may indicate a valid detection of an n-bit unique word if there is a match-up between n-2 bits of the received word and the stored unique word. Thus, the correlator would have its error threshold $\epsilon$ set at $\epsilon = 2$. The setting of a particular threshold will depend upon the bit error rate in the transmission channel and the code word detection probability. Since the error rate may change, it is preferable to have a correlator capable of varying its error threshold. Further, as is often the case in known systems, the complement of the unique word may be used to denote a second event. It is thus desirable that the correlator be able to detect the complement of the unique word, perhaps with a different threshold.

Within the knowledge of the inventors, all available code word correlators that would operate at high bit rates utilize analog detection means. Basically, the analog detector comprises an analog summing amplifier and a variable threshold analog comparator. Examples of conventional correlators may be found in U.S. Pat. No. 3,598,979 to Moreau, issued Aug. 10. 1971, and U.S. Pat. No. 3,346,844 to Scott et al., issued Oct. 10, 1967. Such correlators include the disadvantages that precisely regulated power supplies are required, they are difficult to set up, and further threshold adjustments are not reliable because the preset threshold level has a tendency to drift. Thus, such analog correlators are unreliable since the preset threshold level can not be maintained at a specific value with a high degree of confidence.

SUMMARY OF THE INVENTION

The difficulties encountered with the analog detection type digital code word correlator are overcome by the all digital variable threshold code word correlator of the present invention.

Briefly, the correlator of the present invention includes an n-bit shift register which receives a serial data stream at the system bit rate. The n-bits in the shift register are compared on a bit by bit basis with a stored replica of the expected unique word. The result of the comparison is represented by comparison bits $X_i$ which are applied in pairs to a series of full adders forming the first level of the multilevel digital adder tree. The output of the adder tree is an m-bit binary number representing the number of matches between the bits of the word in the shift register and the corresponding bits of the stored unique word. This m-bit number is applied to a true variable threshold digital comparator which produces a detection signal if the number of matches is equal to or greater than the threshold level which is determined by the predetermined error threshold. The same m-bit number is also applied to a complement variable threshold digital comparator which produces a detection signal if the number of matches is equal to or less than its threshold level. The threshold levels of the true and complement comparators need not be the same.

DETAILED DESCRIPTION OF THE PREFERRED EMBODIMENTS

Figure 1:
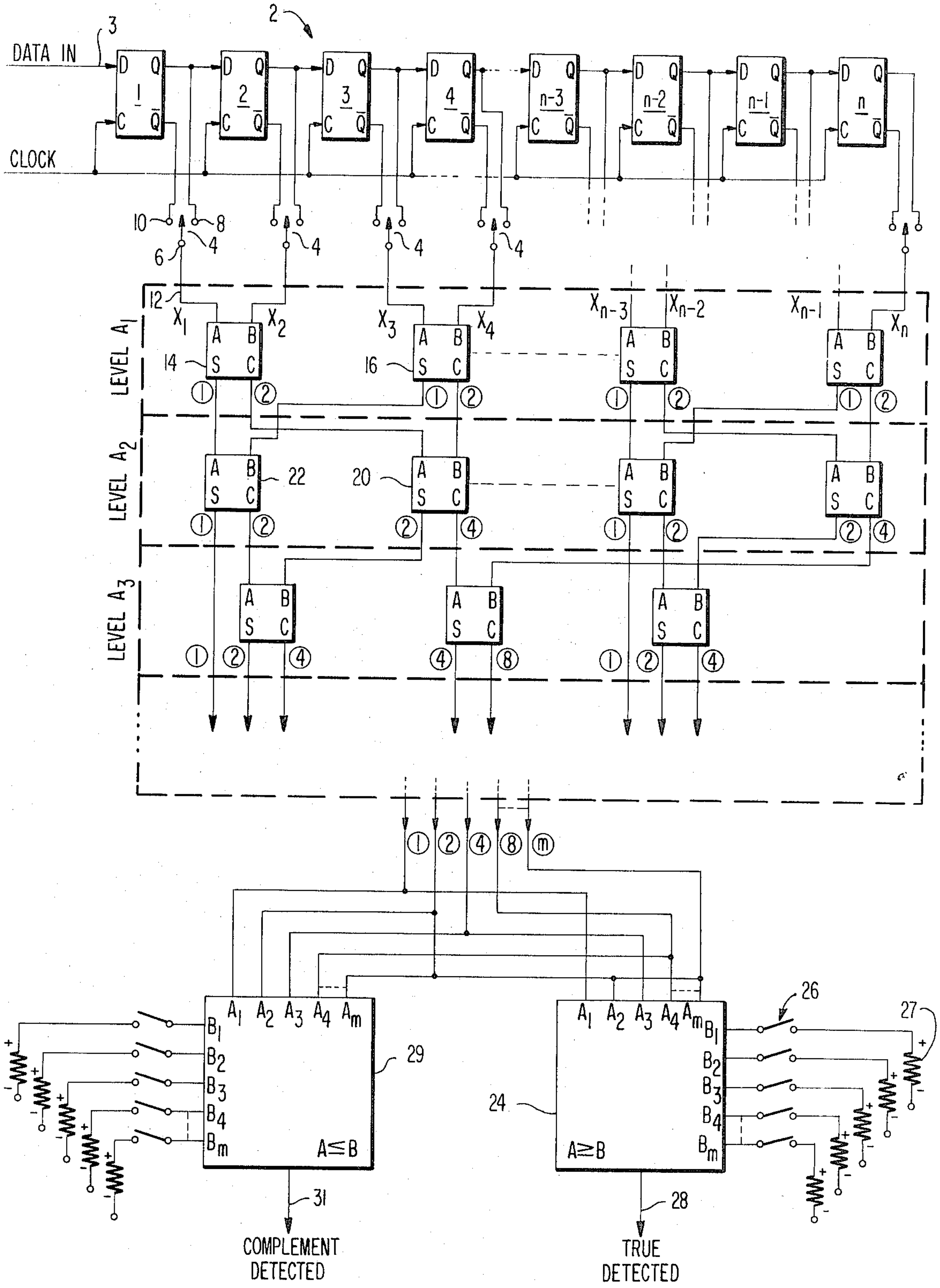
FIG. 1 illustrates in block form the completely digital variable threshold unique word correlator of the present invention.

The all digital correlator of the present invention is illustrated generally in FIG. 1. Received data is serially applied to an n-bit register 2 from line 3. As a new bit enters the first stage of register 2, the bits in each stage shift one bit position. Thus, as each new bit enters the register, a new word is presented for comparison with a stored replica of the expected unique word. The replica of the unique word may be stored in a separate storage register and conventional digital comparator circuits used to compare the stored unique word with the received word in shift register 2 on a bit by bit basis. However, it has been found that this comparison operation can be accomplished in a much simpler and less expensive manner through the use of simple switching elements illustrated in FIG. 1.

More specifically, associated with each register stage is a switch 4 having a movable contact 6 and fixed contacts 8 and 10 connected respectively to the true and complement outputs of the register stage. If the bit stored in the first stage of register 2 is, for example, a logic 1 then the true output Q would be a logic high while the complement output Q would be a logic low. Similarly, if a logic 0 bit is stored in the first stage of register 2, the complement output Q would be at a logic high while the true output Q would be at a logic low.

Let it be assumed that the first bit of the expected unique word is a logic 1. In this case, movable contact 6 of switch 4 associated with the first stage is moved into contact with fixed contact 8. On the other hand, if the first bit of the expected unique word is a logic 0, the contact 6 would be positioned in contact with contact 10. If a match exists between the bit stored in the first stage of register 2 and the corresponding bit of the expected unique word, the comparison bit line 12 coupled to contact 6 would assume a logic high. If a mismatch occurs, line 12 assumes a logic low signalling the mismatch. In a like manner, each stage of register 2 has associated therewith a switch 4 including two fixed contacts connected respectively to the true and complement outputs of the register stage to which it is coupled and a movable contact selectively connected to either of the two fixed contacts. It will thus be appreciated that the switches 4 constitute a means for storing the expected unique word and a means for comparing the stored unique word with the word in said register.

The signal on each comparison bit line 12 is termed herein a comparison bit $X_i$. The comparison bits are applied in pairs to a series of full adders, such as adders 14 and 16 forming a portion of a line of full adders of a multilevel digital adder tree. This first line of adders is termed level $A_1$. A comparison bit $X_i$ at a logic high is considered to have a weight of 1 because it represents one match. If it is at a logic low it has a weight of 0 since it represents the fact that no match has been detected. Thus, comparison bits $X_1$ and $X_2$ associated with the first and second stages of register 2 appear as the A and B inputs to full adder 14. Similarly, comparison bits $X_3$ and $X_4$, indicating respectively the results of the comparison between the bits stored in the third and fourth stages of the register 2 and the third and fourth bits of the expected unique word are applied as the A and B inputs of full adder 16. As the number of bits in the unique word increase, additional adders are required. In general, the number of adders in level $A_1$ will be equal to one half the number of bits of the unique word.

The sum output of each adder in level $A_1$, $S = A \cdot B + A \cdot B$, will be at a logic high if either the A input or the B input to the adder is a logic high but not both. The carry output, $C = A \cdot B$ will be at a logic high, only if both the A and B inputs are both at logic highs. Since a logic high at both the A and the B inputs of an adder, such as adder 14, will result only when two matches are realized, the logic high at the carry output of an adder in level $A_1$ has a weight of 2. The weight of bit on each line is designated by a circled number.

The sum and carry outputs of the adders in level $A_1$ are applied as inputs to a second row of adders forming level $A_2$ of the digital adder tree in the manner illustrated. As is evident from FIG. 1, the outputs from the adders of level $A_2$ have weights of 1, 2 and 4. More specifically, if we assume that the bits of the first four stages of register 2 match the first four bits of the expected unique word, comparison bits of $X_1 \ldots X_4$ are all at a logic high and thus the carry outputs from adders 14 and 16 assume logic high states. These outputs are applied as the A and B inputs to full adder 20 in level $A_2$. Since both the A and B inputs to adder 20, each with the weight of 2, are at a logic high, the carry output of adder 20 has a weight of 4 signifying that four matches have been detected. Since the sum outputs from adders 14 and 16 are at logic lows both the sum and carry outputs of adder 22 in level $A_2$ are at logic lows.

It will now be apparent that the outputs from adders 20 and 22 indicate the total number of matches between the bits in the first four stages of register 2 and the corresponding first four bits of the unique word. For a four bit unique word only two levels of adders are required. As the unique word increases in length, additional adders must be added to level $A_2$ and additional levels are required to generate the binary number. For example, for an 8-bit unique word, level $A_2$ would include four adders and the digital adder tree would have three levels, producing a 4-bit binary number the most significant bit of which has a weight of 8. For a unique word having between 16 and 31 bits, a 5-bit binary number, the most significant bit of which has a weight of 16, is required to indicate the total possible number of matches which might occur. Additional adders would be used to generate this number.

The binary number developed by the adder tree is supplied as one set of inputs, denoted herein as the A inputs,to a variable threshold comparator 24. The threshold level is entered into the comparator via the B inputs. The threshold level is based upon the predetermined error threshold $\epsilon$. When the error threshold $\epsilon = 2$, for a twenty bit unique word, the threshold level would be 18 and the B inputs would receive a binary number set equal to 18, i.e., 10010. The B inputs to the comparator 24 is represented in FIG. 1 by switches 26 coupled to suitable potential sources 27. A logic 1 is generated by closing a switch 26. If there were 18 or more matches,that is, if the binary number to the A inputs of the comparator represents 18 or more, a detection pulse would appear on output line 28 indicating the detection of the unique word.

To detect the complement of the unique word, another comparator 29 is used. If an error free complement of the unique word was stored in register 2, there would be no matches. However, due the bit error rate, the complement of the unique word may be in register 2 although a small number of matches are detected. Thus, an error threshold $\epsilon$ must again be determined. In this case, if the number of matches is equal to or less than the threshold level, the expected complement of the unique word is assumed detected. To detect the complement of a 20-bit unique word having an error threshold $\epsilon = 2$, the B inputs to the complement variable threshold comparator 29 would be set at 2, i.e., 00010. The A inputs to this comparator are the same as applied to true comparator 24. A detection signal appears on line 31 if the number represented by the A inputs is less than or equal to the number represented by the B inputs. In the case of the example under consideration, a detection pulse would appear on line 31 if two or less matches were realized.

Examples of the specific construction of full adders of the adder tree and the comparators will now be described with reference to FIG. 2 which forms a preferred embodiment of the invention.

Figure 2:
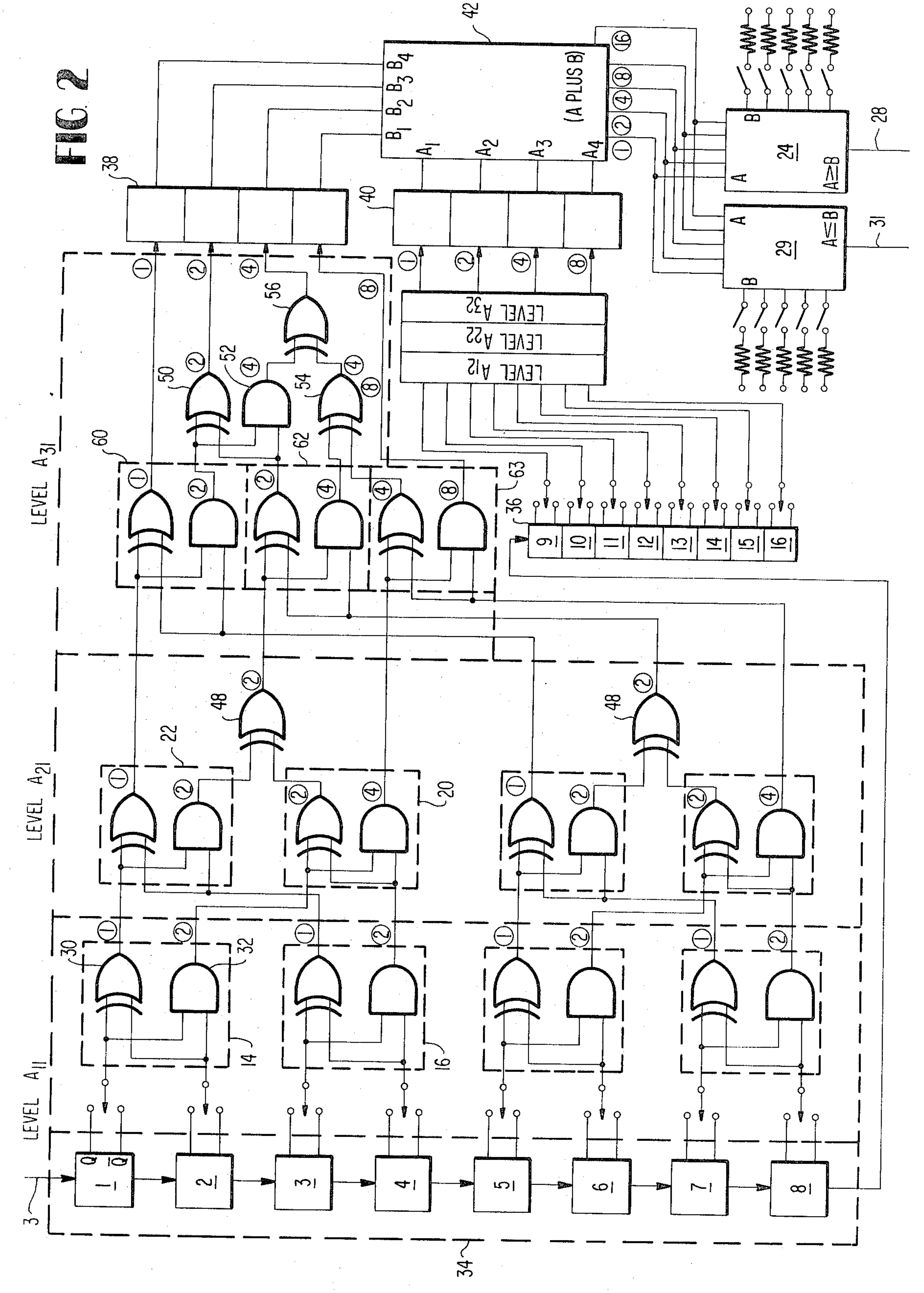
FIG. 2 illustrates the details of various elements forming the variable threshold correlator of FIG. 1.

Although various types of conventional modulo-2 adders can be used in the digital adder tree of the present invention it has been found preferable to form the adders of the first three levels $A_1$, $A_2$ and $A_3$ of the adder tree from exclusive OR and AND logic circuit in the manner illustrated in FIG. 2. Further, it has been found advantageous to build the correlator utilizing a modular approach so that the size of the unique word can be expanded by adding additional printed circuit cards. FIG. 2 illustrates such a correlator for detecting a 16-bit unique word. Two 8-bit registers 34 and 36 are utilized. These registers are serially connected and taken together are equivalent to register 2 of FIG. 1. For larger unique words, additional 8-bit registers wound be used. Each 8-bit register has associated therewith a portion of the multilevel adder tree. Specifically, register 34 has associated therewith partial levels $A_{11}$, $A_{21}$ and $A_{31}$, while register 36 has associated therewith partial levels $A_{12}$, $A_{22}$ and $A_{32}$. The circuitry of levels $A_{11}$ and $A_{12}$, $A_{21}$ and $A_{22}$ and $A_{31}$ and $A_{32}$ are respectively identical. The combined circuitry of partial level $A_{11}$ and partial level $A_{12}$ form level $A_1$. Similarly the circuitry of partial levels $A_{21}$ and $A_{22}$ and $A_{31}$ and $A_{32}$ form respectively levels $A_2$ and $A_3$. For each additional 8-bit register, similar circuitry would be included. The additional circuitry would be mounted on suitable printed circuit cards and plugged into the system.

Since the first three levels of the adders in the adder tree are identical for each 8-bit register, only the circuitry associated with register 34 will be discussed hereinbelow in detail. The outputs of partial levels $A_{31}$ and $A_{32}$ are in the form of a 4-bit binary number having weights 1, 2, 4, and 8 as indicated. In order to equalize the unequal delays encountered by the bits traveling down the adder tree, the outputs from partial levels $A_{31}$ and $A_{32}$ are applied to latches 38 and 40. The bits entering the latches are stored therein for a time sufficient for all the comparison bits resulting from a word stored in the shift registers 34 and 36 to enter these latches. The comparison bits in latches 38 and 40 are then triggered simultaneously to a conventional 4-bit adder 42. This adder may take the form of a Motorola 4-bit adder, Model MC-10181L. Adder 42 has four sum outputs having weights 1, 2, 4 and 8 and a carry output with a weight 16. These outputs are presented to the true variable threshold comparator 24 and the complement variable threshold comparator 29.

Returning to the description of the first three levels of the adder tree, each adder in the first level of the adder tree, such as adder 14 in partial level $A_{11}$ of level $A_1$ is comprised of an exclusive OR circuit 30 and an AND circuit 32. The output of the exclusive OR circuit 30 appears as the sum terminal of the full adder while the output of the AND circuit 32 as the carry terminal. When a match exists with respect to both the first and second stages of register 34 and the corresponding bits of the expected unique word, both inputs to AND circuit 32 are at logic highs causing a logic high with a weight of 2 to appear at the carry terminal of adder 14. If only one mat is realized, the output of exclusive OR circuit 30 assumes a logic high and has a weight of 1. Adder 16 which is identical to adder 14 is coupled to the third and fourth stages of register 34. Similarly every two stages of registers 34 and 36 are connected to an adder identical to adder 14.

The level $A_2$ adders,divided in FIG. 2 into partial levels $A_{21}$ and $A_{22}$, are also constructed in the manner described with respect to adder 14. However, additional circuits, each in the form of exclusive OR circuit 48, are connected to each pair of adders in the second level. The function of the circuit 48 is to consolidate the weight 2 outputs from adders 20 and 22. Exclusive OR circuit 48 can be used rather than another adder since the inputs thereto are mutually exclusive. More specifically, a logic high at the output of the AND circuit of adder 22 signifies that only one match occurred with respect to the first and second stages of register 34 and that one match occurred with respect to the third and fourth stages of this register. However, a logic high at the output of the exclusive OR circuit of adder 20 indicates that two matches occurred with respect to either the first and second or the third and fourth stages of register 34. Thus, the conditions which cause a logic high at the output of the exclusive OR circuit of adder 20 and a logic high at the output of the AND circuit of adder 22 are indeed mutually exclusive.

The outputs from the adders of level $A_2$, having weights 1, 2 and 4, are applied to the inputs of the adders forming level $A_3$. In FIG. 2, the level $A_3$ is comprised of partial levels $A_{31}$ and $A_{32}$. The level $A_3$ adders are again constructed in the manner of adder 14. The portion of level $A_3$ associated with each 8-bit register includes three adder circuits 60, 62, and 63 as well as circuit elements 50, 52, 54 and 56. Exclusive OR circuit 50 and AND circuit 52 form an additional adder receiving the two weight 2 outputs from adders 60 and 62. The function of this additional adder is to consolidate the weight 2 outputs. Since these outputs are not mutually exclusive, the adder is required. The weight 4 outputs from adders 62 and 63 are consolidated through the use of the exclusive OR circuit 54. Circuit 54 like circuit 48 in level $A_2$ is used since these weight 4 outputs are mutually exclusive. Exclusive OR circuit 56 is used in a similar manner to consolidate the weight 4 outputs from exclusive OR circuit 54 and AND circuit 52. As previously indicated the circuitry illustrated as forming partial level $A_{31}$ is duplicated in partial level $A_{32}$.

For a unique word having more than 16 bits, additional 8-bit registers are used. With a 20-bit word, for example, a third register is added. Associated with this third register would be adder tree partial levels $A_{13}$, $A_{23}$ and $A_{33}$ respectively identical to the circuitry in partial levels $A_{11}$, $A_{21}$ and $A_{31}$. The comparison bits corresponding to bit positions 17–20 of the 20-bit unique word pass through additional delay equalizing latches such as latches 38 and 40 with the outputs of these latches supplied to an additional 4-bit adder also receiving the sum outputs of adder 42.

Figure 3:
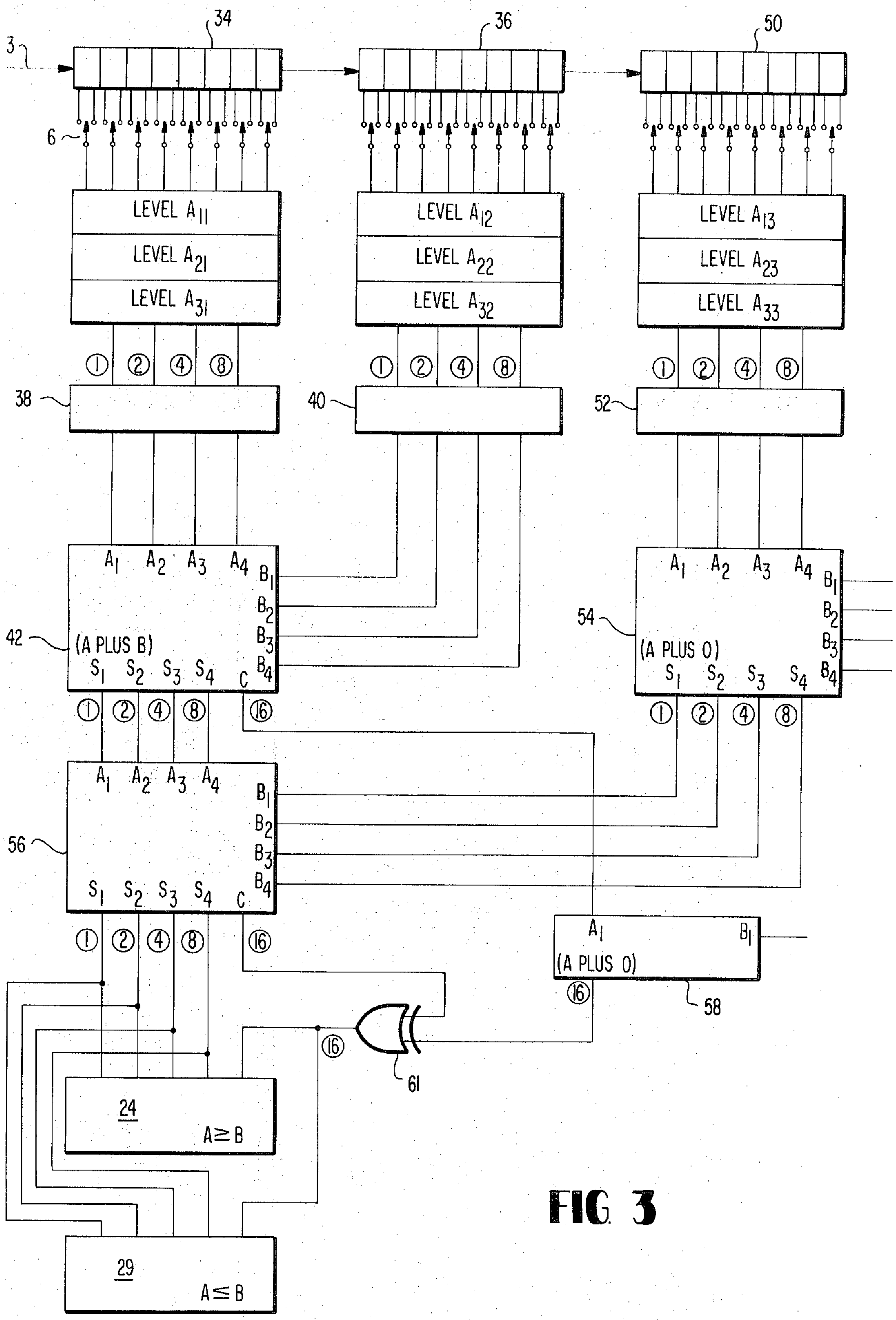
FIG. 3 illustrates the correlator of the invention for detecting a 20-bit unique word.

In order to aid in the complete understanding of the present invention, FIG. 3 is included herein to illustrate the manner of interconnection of the elements previously described to develop a 20-bit correlator. Like elements in FIGS. 1, 2 and 3 are denoted by common numerical designators. As discussed with respect to FIG. 2, the outputs of the adders forming partial levels $A_{31}$, and $A_{32}$, have weights 1, 2, 4 and 8 and are applied to latches 38 and 40 to equalize the delay time. To accommodate the four additional bits, register 50 is added with only the first four bit positions being used. The outputs from partial level $A_{33}$ is supplied to a delay equalizing latch 52. Adder 54 may be included to equalize the rate of comparison bit flow through the adder tree. Adder 54 simply passes the outputs of latch 52 unaltered to 4-bit adder 56. The sum outputs from adders 42 and 54 are applied to adder 56 while the carry output from adder 42 is applied to the A inputs of adder 58. Adder 58 passes the carry output from adder 42 unaltered and is used, like adder 54, to equalize the rate of bit flow through the adder tree. An exclusive OR gate 61 is used to consolidate the carry outputs from adders 56 and 58. The output from exclusive OR gate 61 as well as the sum outputs from adder 56, forming a binary number representing the number of matches realized between the word in registers 34, 36 and 50 and the expected unique word, are applied as the A inputs to comparators 24 and 29 as previously described.

The variable threshold comparators 24 and 29 are identical. These comparators may be Fairschild 5-bit comparator Model No. F95H55. However, other comparators may be used. For example, the comparators may take the form of 5-bit adder circuits, the A inputs thereto being the binary number from the adder tree. The B inputs would then be the threshold level. Suitable logic circuitry such as AND gates would be selectively coupled to the output of the adder forming the comparator to generate a detection signal. For example, when the true comparator 24 is comprised of an adder and associated logic circuitry, assuming a 20-bit unique word with an threshold error $\epsilon = 2$, the B inputs to the adder would be set at 18. The unique word would be detected if the output of the adder equalled 36 or more. Therefore, the logic circuitry would be set to generate a logic high detection signal when the output of the adder corresponded to the number 36 or greater.

While the invention has been particularly shown and described with reference to a preferred embodiment thereof, it will be understood by those skilled in the art that various changes in form and details may be made therein without departing from the spirit and scope of the invention.

What is claimed is:

1. A digital code word correlator comprising:

bit by bit comparison means for comparing a first digital word with a second digital word on a bit by bit basis and providing a number of output signals equal to the number of matches between said first and second digital words, a digital adder tree responsive to said number of output signals for generating a binary number representing the number of matches between the bits of the first digital word and the corresponding bits of the second digital word, and a variable threshold digital comparator means responsive to said binary number for producing a detection signal indicating the state of correspondence between the first and second digital words.

2. The digital code word correlator of claim 1 wherein said bit by bit comparison means comprises a shift register for storing said first digital word, each stage of said shift register having a true and complement output, and a plurality of switch means one coupled to each register stage selectively connecting either the true or complement output of each stage to said adder tree.

3. The digital code word correlator of claim 1 wherein said adder tree comprises a plurality of rows of digital adders arranged so that each row consolidates the output bits from the preceeding row, the first row being coupled to said comparing means whereby the bits from the last row represent a binary number indicating the number of matches between corresponding bits of the first and second digital words.

4. The digital code word correlator of claim 3 wherein each adder of said adder tree in the first three rows of adders is comprised of an exclusive OR circuit and an AND circuit.

5. The digital code word correlator of claim 4 wherein said adder tree further includes latch means for equalizing the delay experienced by bits flowing through the adder tree.

6. The digital code word correlator of claim 5 wherein said variable threshold digital comparator produces a detection signal indicating effective correspondence between said first and second digital words, further including another variable threshold digital comparator responsive to said binary number for producing a detection signal indicating that said first digital code word is the complement of said second digital code word.

7. A digital code word correlator comprising:

means for receiving a data stream, means for storing an n-bit word forming a portion of said data stream, means for comparing the stored n-bit word with a unique word on a bit by bit basis, the result of said comparison being represented by comparison bits, a multilevel digital adder tree responsive to said comparison bits for producing a binary number representing the number of matches between the bits of said stored word and the corresponding bits of the unique word, and a variable threshold digital comparator having a preset threshold level and being responsive to said binary number for producing a detection signal when the binary number is equal to or greater than the preset threshold level.

8. The digital code word correlator of claim 7 further including another variable threshold digital comparator having a preset threshold level and being responsive to said binary number for producing another detection signal when the binary number is equal to less than its threshold level.

* * * * *

UNITED STATES PATENT OFFICE
CERTIFICATE OF CORRECTION

Patent No. 3,796,868 Dated March 12, 1974

Inventor(s) Pradman Prithvinath Kaul et al

It is certified that error appears in the above-identified patent and that said Letters Patent are hereby corrected as shown below:

IN THE SPECIFICATION:

Column 1

Line 31, after "However," insert --as is well known--

Lines 32-34, delete "Thus the received unique word will not match up having certain bit errors therein, completely with the stored unique word." and insert --Thus the received unique word, having certain bit errors therein, will not march-up completely with the stored unique word.--

Column 2

Line 64, delete "Q" and insert --$\overline{Q}$--

Line 66, delete "Q" and insert --$\overline{Q}$--

Column 3

Lines 43-44, delete "A.B + A.B " and insert --A.$\overline{B}$ + $\overline{A}$.B--

Line 47, after "C=A.B" insert --,--

Signed and sealed this 1st day of October 1974.

(SEAL)
Attest:

McCOY M. GIBSON JR.
Attesting Officer

C. MARSHALL DANN
Commissioner of Patents